(12) United States Patent
Gazzino

(10) Patent No.: US 12,497,183 B2
(45) Date of Patent: Dec. 16, 2025

(54) MONITORING SYSTEM FOR MONITORING A HYBRID POWER PLANT OF A ROTORCRAFT, ASSOCIATED ROTORCRAFT AND METHOD

(71) Applicant: AIRBUS HELICOPTERS, Marignane (FR)

(72) Inventor: Marc Gazzino, Marseilles (FR)

(73) Assignee: AIRBUS HELICOPTERS, Marignane (FR)

( * ) Notice: Subject to any disclaimer, the term of this patent is extended or adjusted under 35 U.S.C. 154(b) by 0 days.

(21) Appl. No.: 18/816,476

(22) Filed: Aug. 27, 2024

(65) Prior Publication Data

US 2025/0171157 A1   May 29, 2025

(30) Foreign Application Priority Data

Nov. 27, 2023   (FR) ........................................ 2313102

(51) Int. Cl.
  *B64D 31/18*   (2024.01)
  *B64D 27/33*   (2024.01)
  *B64D 35/022*  (2025.01)

(52) U.S. Cl.
  CPC ............. *B64D 31/18* (2024.01); *B64D 27/33* (2024.01); *B64D 35/022* (2024.01)

(58) Field of Classification Search
  CPC ...... B64D 31/18; B64D 27/33; B64D 35/022; B64D 35/08; B64D 27/02; B64D 27/24
  See application file for complete search history.

(56) References Cited

U.S. PATENT DOCUMENTS

| 2015/0096411 A1* | 4/2015 | Newburg .............. F02N 15/022 74/7 E |
| 2019/0382124 A1 | 12/2019 | Massot et al. |
| 2020/0277072 A1 | 9/2020 | Zoppitelli et al. |
| 2021/0031934 A1* | 2/2021 | Becker ................... B64D 31/18 |
| 2021/0098763 A1* | 4/2021 | Buzzard ............ H01M 10/6562 |
| 2024/0116645 A1* | 4/2024 | Mark ...................... B64D 27/33 |

FOREIGN PATENT DOCUMENTS

FR        3122407 A1    11/2022

OTHER PUBLICATIONS

French Search Report for French Application No. FR2313102, Completed by the French Patent Office, Dated May 16, 2024, 10 pages.

* cited by examiner

*Primary Examiner* — Rodney A Bonnette
(74) *Attorney, Agent, or Firm* — BROOKS KUSHMAN P.C.

(57) ABSTRACT

A monitoring system for monitoring a hybrid power plant of a rotorcraft comprising at least one rotor. The hybrid power plant has an electric motor comprising a first drive shaft, a heat engine comprising a second drive shaft and a gearbox. The monitoring system includes at least one first sensing device measuring a first item of torque information representative of a first engine torque C1 transmitted by the first drive shaft to a first input shaft of the gearbox and a controller comparing the first engine torque C1 with a first limit value VL1.

20 Claims, 3 Drawing Sheets

MONITORING SYSTEM FOR MONITORING A HYBRID POWER PLANT OF A ROTORCRAFT, ASSOCIATED ROTORCRAFT AND METHOD

CROSS REFERENCE TO RELATED APPLICATIONS

This application claims priority to FR 23 13102 filed on Nov. 27, 2023, the disclosure of which is incorporated in its entirety by reference herein.

TECHNICAL FIELD

The present disclosure relates to the field of hybrid power plants for rotorcraft comprising both a heat engine and an electric motor respectively capable of transmitting engine torque in parallel to input shafts of a gearbox. An output shaft of the gearbox is connected to at least one rotor and enables it to be rotated.

Furthermore, hereinafter, the term "rotor" may refer, in particular, to a lift rotor, an anti-torque rotor for controlling the yaw movements of the rotorcraft or a pusher or tractor propeller.

The disclosure proposes a solution for monitoring the mechanical behavior of such a hybrid power plant in order to detect excessive torque when the heat engine and electric motor are operating simultaneously, and protect the gearbox in the event of failure or limits being exceeded.

Exceeding torque limits is undesirable and can result in damage to the gearbox.

BACKGROUND

Furthermore, document US2019382124 relates to a method and a device for limiting torque on a rotorcraft comprising at least three engines (10) with non-equal power distribution, these engines (10) being able to be heat engines (12, 13) and electric motors (11).

A management computer (75) can calculate, for each engine (11, 12, 13), a distribution coefficient (alpha, beta, gamma) that reflects the percentage of the total power (ptot) to be delivered by that engine.

Each distribution coefficient may be determined using laws and/or tables of values or the equivalent that are stored in the rotorcraft, for example in a memory (77) of the management computer (75).

The management computer (75) calculates, for each engine (11, 12, 13) an associated engine torque limit (limcouplemoteur1, limcouplemoteur2, limcouplemoteur3), by taking into consideration the distribution coefficient (alpha, beta, gamma) assigned to the engine.

The engine torque limit (limcouplemoteur1, limcouplemoteur2, limcouplemoteur3) assigned to an engine is equal to the minimum from among the gearbox input torque limit (limcoupleboite1, limcoupleboite2, limcoupleboite3) assigned to that engine and an intermediate limit (limint) assigned to the engine.

The current engine torque assigned to an engine (11, 12, 13) may be measured with a torquemeter on the output shaft (21, 22, 23) of that engine (11, 12, 13).

Therefore, each engine computer (61, 62, 63) regulates the engine that it controls as a function of the current engine torque assigned to that engine and the engine torque limit (limcouplemoteur1, limcouplemoteur2, limcouplemoteur3) assigned to that engine.

Each engine computer (61, 62, 63) may, in particular, control a fuel metering valve associated with each engine.

Moreover, three output shafts (21, 22, 23) may be linked respectively to three input shafts (31, 32, 33) by three free-wheels (51) and three connecting shafts (52).

Documents FR3122407 and US2020277072 relate to other transmission systems between an electric motor and an aircraft rotor.

SUMMARY

An object of the present disclosure is thus to propose an innovative monitoring system intended to protect a gearbox set in motion by a hybrid power plant.

The disclosure therefore relates to a monitoring system for monitoring a hybrid power plant of a rotorcraft comprising at least one rotor, the hybrid power plant comprising:
an electric motor electrically connected by an electrical connection to at least one electrical energy source, the electric motor comprising a first drive shaft;
a heat engine comprising a second drive shaft; and
a gearbox comprising:
a first input shaft connected by a first mechanical connection to the first drive shaft;
a second input shaft connected by a second mechanical connection to the second drive shaft; and
an output shaft connected by a third mechanical connection to said at least one rotor;
at least one first sensing device measuring a first item of torque information representative of a first engine torque C1 transmitted by the first drive shaft to the first input shaft; and
a memory storing a first limit value VL1 relating to the first engine torque C1.

According to the disclosure, such a monitoring system is remarkable in that it comprises a controller comparing the first engine torque C1 with the first limit value VL1 and consequently controlling a first reversible transmission device configured to transmit and, alternatively, prevent the transmission of the first engine torque C1, the first reversible transmission device being controlled to allow the first drive shaft to rotate the first input shaft when the first engine torque C1 is less than the first limit value VL1 and to prevent the first drive shaft from rotating the first input shaft when the first engine torque C1 is greater than or equal to the first limit value VL1.

In other words, measuring the first item of torque information makes it possible to directly determine the value of the first engine torque C1 or to calculate this value of the first engine torque C1. The first engine torque C1 is therefore a current value that may vary as a function of the torque requirements during a maneuver performed by the rotorcraft, the load on board the rotorcraft and external conditions such as atmospheric pressure and wind force. Furthermore, the on-board load may be input by a pilot or may possibly be measured and comprise the mass of the on-board fuel and the mass of the crew present in the rotorcraft.

The first limit value VL1 is predetermined and fixed. It may be determined, in particular, by trials, flight tests or simulations. Furthermore, this first limit value VL1 may be specific to the rotorcraft or to the hybrid power plant.

The controller monitors the variations of the first engine torque C1 and, when this first engine torque C1 becomes equal to or greater than the first limit value VL1, it generates a control order that is transmitted to the first reversible transmission device. This control order is intended to at least temporarily prevent the first drive shaft from rotating the first input shaft and therefore prevents the first engine torque C1 from being transmitted to the first input shaft.

The total engine torque transmitted to the output shaft is then solely a function of that supplied by the heat engine via the second mechanical connection and the second input shaft.

Moreover, this control order may be maintained until the end of the flight or for a predetermined time period allowing the pilot of the rotorcraft to act on the flight controls of the rotorcraft.

Advantageously, displaying information representative of the first engine torque C1 and the first limit value VL1 may then allow the pilot of the rotorcraft to act on flight controls to reduce the value of the first engine torque C1 before the first limit value VL1 is reached.

Furthermore, several embodiments of the first reversible transmission device may be considered.

Therefore, according to a first embodiment, the first reversible transmission device may comprise a first clutch positioned in the first mechanical connection, the first clutch being arranged in an engaged state when the first torque C1 is less than the first limit value VL1 and the first clutch being arranged in a disengaged state when the first torque C1 is greater than or equal to the first limit value VL1.

Such a first clutch may therefore be controlled mechanically, hydraulically or electrically by the controller. When the first clutch is arranged in the disengaged state, the first engine torque C1 is then immediately cancelled by a reversible break or disengagement of the mechanical transmission in the first mechanical connection.

According to a second embodiment, the first reversible transmission device may comprise an electric switch positioned in the electrical connection, the electric switch being arranged in a closed state when the first torque C1 is less than the first limit value VL1 and the electric switch being arranged in an open state when the first torque is greater than or equal to the first limit value VL1.

Such a switch may, for example, be relay or a circuit breaker controlled electrically by the controller. In this case, when the switch is arranged in the open state, the first torque C1 is then immediately cancelled by a reversibly cutting off the supply of electrical energy in the electrical connection.

Advantageously, the electrical connection may comprise an inverter transforming a direct electric current of electricity stored in said at least one electrical energy source into an alternating electric current supplying the electric motor with electricity, the electric switch being positioned along a direction of flow of the electric current between the at least one electrical energy source and the inverter.

Therefore, the electric switch can cut off the supply of electricity to the electric motor by opening its power supply circuit between the electrical energy source or sources and the inverter.

According to one alternative, the electric switch may be positioned along a direction of flow of the electric current between the inverter and at least one terminal supplying electricity to the electric motor.

In this case, the electric switch can cut off the supply of electricity to the electric motor by opening its power supply circuit between the inverter and a terminal supplying the electric motor.

In practice, said at least one first sensing device may comprise a voltage sensor measuring an electrical supply voltage between two terminals supplying electricity to the electric motor, said at least one first sensing device comprising an intensity sensor measuring an electrical supply intensity of the electric current flowing in the electrical connection.

Therefore, the monitoring system may comprise voltage and intensity sensors capable of measuring the electrical power consumed by the electric motor.

Alternatively, or additionally, said at least one first sensing device may comprise a rotational speed sensor measuring a rotational speed of the first drive shaft in relation to a housing of the electric motor.

Therefore, by knowing the electrical power consumed by the electric motor, the efficiency of the electric motor and the rotational speed of the first drive shaft, the controller can calculate the first engine torque transmitted by the first drive shaft to the first input shaft according to the following formula:

$$C1 = \frac{U * I * \rho}{\omega}$$

where U is the electrical supply voltage between two terminals supplying electricity to the electric motor;
I is the electrical supply intensity of the electric current flowing in the electrical connection;
$\rho$ is the efficiency of the electric motor; and
$\omega$ is the rotational speed of the first drive shaft.

Advantageously, and irrespective of the embodiment of the power plant, the monitoring system may comprise:
at least one second sensing device measuring a second item of torque information representative of a second engine torque C2 transmitted by the second drive shaft to the second input shaft;
the memory storing a second limit value VL2 relating to the second engine torque C2; and
the controller comparing the second engine torque C2 with the second limit value VL2 and controlling a second reversible transmission device configured to transmit and, alternatively, prevent the transmission of the second engine torque C2, the second reversible transmission device being controlled to allow the second drive shaft to rotate the second input shaft when the second engine torque C2 is less than the second limit value VL2 and to prevent the second drive shaft from rotating the second input shaft when the second engine torque C2 is greater than or equal to the second limit value VL2.

In other words, measuring the second item of torque information makes it possible to directly determine the value of the second engine torque C2 or to calculate this value of the second engine torque C2. The second engine torque C2 is therefore also a current value that may vary as a function of the torque requirements during a maneuver performed by the rotorcraft, the load on board the rotorcraft and external conditions such as atmospheric pressure and wind force.

The second limit value VL2 is predetermined and fixed. It may be determined, in particular, by trials, flight tests or simulations and be specific to the rotorcraft or to the power plant.

The controller monitors the variations of second engine torque C2 and, when this second engine torque C2 is greater than or equal to the second limit value VL2, it generates a control order that is transmitted to the second reversible transmission device transmitting the second engine torque C2. This control order is intended to at least temporarily prevent the second drive shaft from rotating the second input shaft and therefore cancels the second engine torque C2.

The total engine torque transmitted to the output shaft is then zero or equal to the first engine torque C1.

Moreover, this control order may be maintained until the end of the flight or for a predetermined time period allowing the pilot of the rotorcraft to act on the flight controls of the rotorcraft.

Moreover, displaying information representative of the second engine torque C2 and the second limit value VL2 may then allow the pilot of the rotorcraft to act on flight controls to reduce the value of the second engine torque C2 before the second limit value VL2 is reached.

According to a first embodiment, the second reversible transmission device may comprise a second clutch positioned in the second mechanical connection, the second clutch being arranged in an engaged state when the second engine torque C2 is less than the second limit value VL2 and the clutch being arranged in a disengaged state when the second torque C2 is equal to or greater than the second limit value VL2.

Such a second clutch may therefore be controlled mechanically, hydraulically or electrically by the controller. When the second clutch is arranged in the disengaged state, the second engine torque C2 is then immediately cancelled or prevented from being transmitted by a reversible break or disengagement of the mechanical transmission in the second mechanical connection.

According to a second embodiment, the second reversible transmission device may comprise a fuel metering valve supplying fuel to the heat engine, the fuel metering valve being arranged in an open state with a non-zero fuel flow rate when the second engine torque C2 is less than the second limit value VL2 and the fuel metering valve being arranged in a closed state with no fuel flow when the second engine torque C2 is equal to or greater than the second limit value VL2.

Therefore, the fuel metering valve can cut off the supply of fuel to the heat engine by stopping a flow of fuel flowing in a fuel supply circuit between the tank and a combustion chamber of the heat engine.

According to a third embodiment, the second reversible transmission device may comprise a cut-off valve supplying fuel to a fuel metering valve, the fuel cut-off valve being arranged in an open position with a non-zero fuel flow rate when the second engine torque C2 is less than the second limit value VL2 and the cut-off valve being arranged in a closed position to cut off the flow of fuel when the second engine torque C2 is equal to or greater than the second limit value VL2.

Therefore, such a cut-off valve is independent of the fuel metering valve in order to prevent a failure of the fuel metering valve, for example if it is blocked in an open state with a non-zero fuel flow rate, from preventing the second reversible transmission device from cutting off the heat engine and therefore cancelling the transmission of the second engine torque C2.

In practice, in the second embodiment and the third embodiment, the second reversible transmission device also comprises a free-wheel arranged between the second drive shaft and the second input shaft in order to automatically uncouple the heat engine when it is no longer supplied with fuel.

In practice, said at least one second sensing device may comprise a torquemeter directly measuring the second engine torque C2.

Such a torquemeter may then be arranged in the second mechanical connection between the second drive shaft and the second input shaft.

Advantageously, and irrespective of the preceding embodiments, the monitoring system may comprise:
at least one third sensing device measuring a third item of torque information representative of a third engine torque C3 transmitted by the output shaft to said at least one rotor;
the memory storing a third limit value VL3 relating to the third engine torque C3; and
the controller comparing the third engine torque C3 with the third limit value VL3 and controlling at least one reversible transmission device from among the first and second reversible transmission devices, said at least one reversible transmission device being controlled to allow the first and second drive shafts to rotate the first and second input shafts when the third engine torque C3 is less than the third limit value VL3 and to prevent at least one of the first and second drive shafts from rotating the first or the second input shaft respectively when the third engine torque C3 is greater than or equal to the third limit value VL3.

In other words, measuring the third item of torque information makes it possible to directly determine the value of the third engine torque C3 or to calculate this value of the third engine torque C3. The third engine torque C3 is therefore also a current value that may vary as a function of the torque requirements during a particular maneuver performed by the rotorcraft, the load on board the rotorcraft and external conditions such as atmospheric pressure and wind force.

Alternatively, the monitoring system may not be provided with a sensing device measuring a third item of torque information representative of a third engine torque C3 transmitted by the output shaft. In this case, the value of the third engine torque C3 may be determined directly by the controller by calculating the sum of the first engine torque C1 and the second engine torque C2.

Regardless of whether the third engine torque C3 is measured or calculated, the third limit value VL3 is predetermined and fixed. It may be determined, in particular, by trials, flight tests or simulations.

The controller monitors the variations of the third engine torque C3 and, when this third engine torque C3 is greater than or equal to the third limit value VL3, it generates a control order that is transmitted to at least one of the first and second reversible transmission devices transmitting the first and second engine torque. This control order is intended to at least temporarily prevent the first and/or the second drive shaft from rotating the first and/or the second input shaft and therefore cancels the first engine torque C1 and/or the second engine torque C2.

The total engine torque transmitted to the output shaft may then be equal to the first engine torque C1, the second engine torque C2 or zero.

This control order may moreover be maintained until the end of the flight or for a predetermined time period allowing the pilot of the rotorcraft to act on the flight controls of the rotorcraft in order to reduce the third engine torque C3 below the third limit value VL3 when the third limit value VL3 is exceeded due to a maneuver by the pilot.

According to a first alternative embodiment of the disclosure, when the third engine torque C3 is greater than or equal to the third limit value VL3, the controller may firstly control the first reversible transmission device to prevent the first drive shaft from rotating the first input shaft; then, if the third engine torque C3 remains greater than or equal to the third limit value VL3 after controlling the first reversible transmission device, the controller controls the second reversible transmission device to prevent the second drive shaft from rotating the second input shaft.

In this case, the controller therefore generates, firstly, a first control order that is transmitted to the first reversible transmission device transmitting the first engine torque C1 and, secondly, a second control order that is transmitted to the second reversible transmission device transmitting the second engine torque C2. The controller therefore makes it possible to sequentially prevent the transmission of the first engine torque C1 to the first input shaft and then the second engine torque C2 to the second input shaft.

According to a second alternative embodiment of the disclosure, when the third engine torque C3 is greater than or equal to the third limit value VL3, the controller may simultaneously control the first reversible transmission device to prevent the first drive shaft from rotating the first input shaft and the second reversible transmission device to prevent the second drive shaft from rotating the second input shaft.

According to a third alternative embodiment of the disclosure, when the third engine torque C3 is greater than or equal to the third limit value VL3, the controller may first identify a more powerful engine and a less powerful engine from among the electric motor and the heat engine, then firstly control a reversible transmission device corresponding to the less powerful engine, and then, if the third engine torque C3 remains greater than or equal to the third limit value VL3, the other reversible transmission device corresponding to the more powerful engine.

Such a third alternative embodiment of the disclosure therefore makes it possible to maintain maximum availability of propulsion power for the rotorcraft.

According to a fourth alternative embodiment of the disclosure, when the third engine torque C3 is greater than or equal to the third limit value VL3, the controller may first identify an engine with maximum available energy and an engine with minimum available energy from among the electric motor and the heat engine, then firstly control a reversible transmission device corresponding to the engine with minimum available energy and then, if the third engine torque C3 remains greater than or equal to the third limit value VL3, the other reversible transmission device corresponding to the engine with maximum available energy.

Such a fourth alternative embodiment of the disclosure therefore helps promote a maximum flight time for the rotorcraft.

Furthermore, the choice between the different alternative embodiments of the disclosure may depend, for example, on the type of mission being carried out or may be arbitrary, depending on the piloting preferences of a pilot.

In this case, the controller therefore generates, at the same time, a first control order that is transmitted to the first reversible transmission device transmitting the first engine torque C1 and a second control order that is transmitted to the second reversible transmission device transmitting the second engine torque C2. The controller can then be used to simultaneously cancel the first engine torque C1 and the second engine torque C2.

The disclosure also relates to a rotorcraft comprising a hybrid power plant as described above and at least one rotor.

Such a rotorcraft is remarkable in that it comprises a monitoring system as described above for monitoring the hybrid power plant.

The object of the present disclosure is also a monitoring method for monitoring a hybrid power plant of a rotorcraft comprising at least one rotor, the hybrid power plant comprising:
an electric motor electrically connected by an electrical connection to at least one electrical energy source, the electric motor comprising a first drive shaft;
a heat engine comprising a second drive shaft; and
a gearbox comprising:
a first input shaft connected by a first mechanical connection to the first drive shaft;
a second input shaft connected by a second mechanical connection to the second drive shaft; and
an output shaft connected by a third mechanical connection to said at least one rotor.

Such a method comprises at least the following steps:
measuring, with at least one sensing device, a first item of torque information representative of a first engine torque C1 transmitted by the first drive shaft to the first input shaft; and
comparing, with a controller, the first engine torque C1 and a first limit value VL1.

According to the disclosure, such a method is remarkable in that it comprises controlling, with the controller, a first reversible transmission device configured to transmit and, alternatively, prevent the transmission of the first engine torque C1, the first reversible transmission device being controlled to allow the first drive shaft to rotate the first input shaft when the first engine torque C1 is less than the first limit value VL1 and to prevent the first drive shaft from rotating the first input shaft when the first engine torque C1 is greater than or equal to the first limit value VL1.

Such a monitoring method is therefore implemented in a rotorcraft and during a flight phase of the rotorcraft during which the engine torque transmitted to the rotor varies by increasing, for example when there is a control failure in the hybrid power plant or a piloting maneuver requiring high torque for the rotor or the gearbox.

BRIEF DESCRIPTION OF THE DRAWINGS

The disclosure and its advantages appear in greater detail in the context of the following description of embodiments given by way of illustration and with reference to the accompanying figures, wherein.

DETAILED DESCRIPTION

Elements that are present in more than one of the figures are given the same references in each of them.

As already disclosed, the disclosure relates to a monitoring system for monitoring a hybrid power plant of a rotorcraft.

Figure 1:
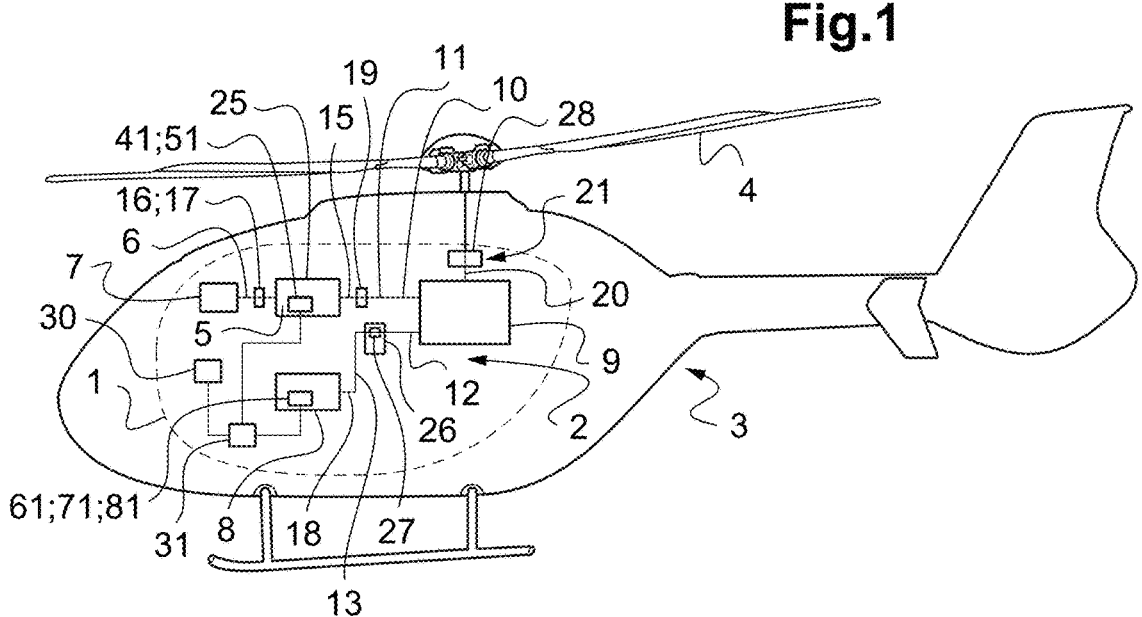
FIG. 1 is a diagram of a rotorcraft equipped with a monitoring system according to the disclosure.

As shown in FIG. 1, such a rotorcraft comprises at least one rotor 4 that may, for example, be a lift rotor, an anti-torque rotor for controlling the yaw movements of the rotorcraft or a pusher or tractor propeller.

Furthermore, such a hybrid power plant 2 comprises an electric motor 5 electrically connected by an electrical connection 6 to at least one electrical energy source 7. The electric motor 5 therefore comprises a first drive shaft 15.

The hybrid power plant 2 also comprises a heat engine 8 comprising a second drive shaft 18.

Moreover, this hybrid power plant 2 also comprises a gearbox 9 comprising a first input shaft 10, a second input shaft 12 and an output shaft 20.

The first input shaft 10 is mechanically connected by a first mechanical connection 11 to the first drive shaft 15 and the second input shaft 12 is mechanically connected by a second mechanical connection 13 to the second drive shaft 18.

Furthermore, the output shaft 20 is mechanically connected by a third mechanical connection 21 to said at least one rotor 4.

Moreover, each mechanical connection 11, 13 and 21 may comprise at least one shaft, at least one mechanical connector such as a free-wheel, a clutch and a rotational speed reduction stage comprising gears, a pinion or a toothed wheel.

Such a monitoring system 1 comprises at least one first sensing device 16, 17, 19 measuring a first item of torque information representative of a first engine torque C1 transmitted by the first drive shaft 15 to the first input shaft 10.

Such a first sensing device 16, 17, 19 may therefore comprise a voltage sensor 16 and an intensity sensor 17 arranged in the electrical connection 6.

Figure 2:
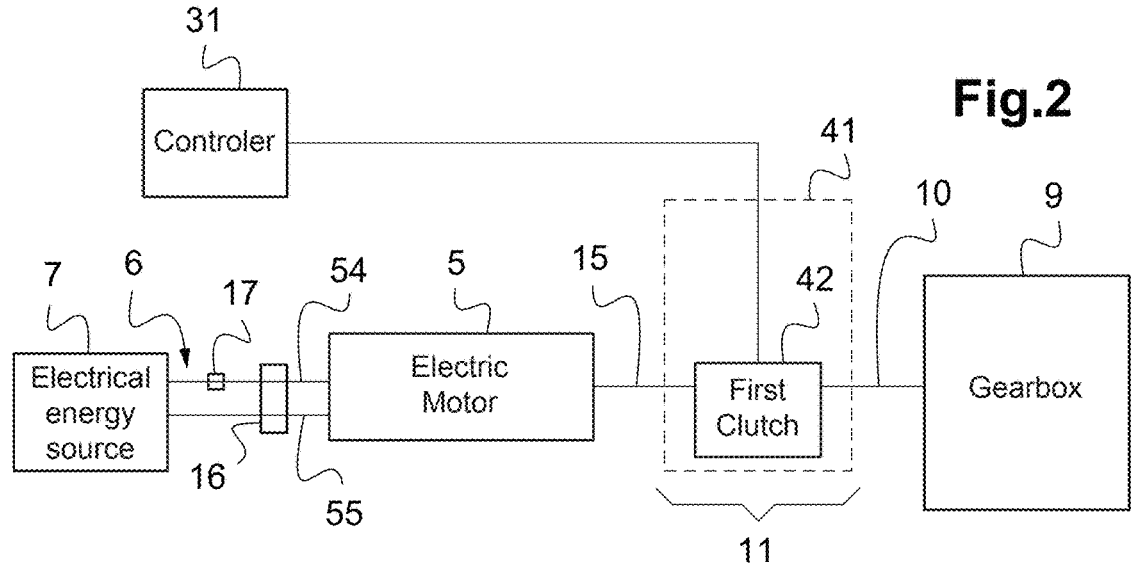
FIG. 2 is a schematic diagram showing a first variant of the control of a first reversible transmission device, according to the disclosure.

As shown in greater detail in FIG. 2, the voltage sensor 16 can measure an electrical supply voltage between two terminals 54, 55 supplying electricity to the electric motor 5 and the intensity sensor 17 can measure an electrical supply intensity of the electric current flowing in the electrical connection 6.

Moreover, said first sensing device 16, 17, 19 may also comprise a rotational speed sensor 19 measuring a rotational speed of the first drive shaft 15 in relation to a housing 25 of the electric motor 5.

The term "sensor" should be understood to mean a physical sensor capable of directly measuring the parameter in question but also a system that may comprise one or more physical sensors as well as means for processing the signal that make it possible to provide an estimation of the parameter based on the measurements provided by these physical sensors. Similarly, the notion of measuring parameters refers to both a raw measurement from a physical sensor and a measurement obtained by relatively complex processing of raw measurement signals.

The monitoring system 1 can then calculate the first engine torque C1 supplied by the first drive shaft 15 to the first input shaft 10 according to the following formula:

$$C1 = \frac{U * I * \rho}{\omega}$$

where U is the electrical supply voltage between the two terminals 54, 55 supplying electricity to the electric motor 5;

I is the electrical supply intensity of the electric current flowing in the electrical connection 6;

ρ is the efficiency of the electric motor 5; and

ω is the rotational speed of the first drive shaft 15 in relation to the housing 25.

The monitoring system 1 comprises a memory 30 storing a first limit value VL1 relating to the first engine torque C1.

The monitoring system 1 also comprises a controller 31 that receives or calculates the first engine torque C1 according to the formula indicated above, for example. The controller 31 compares the first engine torque C1 with the first limit value VL1 and controls a first reversible transmission device 41, 51 configured to transmit and, alternatively, prevent the transmission of the first engine torque C1.

This first reversible transmission device 41, 51 therefore receives a control order from the controller 31 to allow the first drive shaft 15 to rotate the first input shaft 10 when the first engine torque C1 is less than the first limit value VL1 and another control order to prevent the first drive shaft 15 from rotating the first input shaft 10 when the first engine torque C1 is greater than or equal to the first limit value VL1.

By way of example, the controller 31 may comprise at least one processor and at least one memory, at least one integrated circuit, at least one programmable system, or at least one logic circuit, these examples not limiting the scope to be given to the term "controller". The term "processor" may refer equally to a central processing unit or CPU, a graphics processing unit or GPU, a digital signal processor or DSP, a microcontroller, etc.

Figure 3:
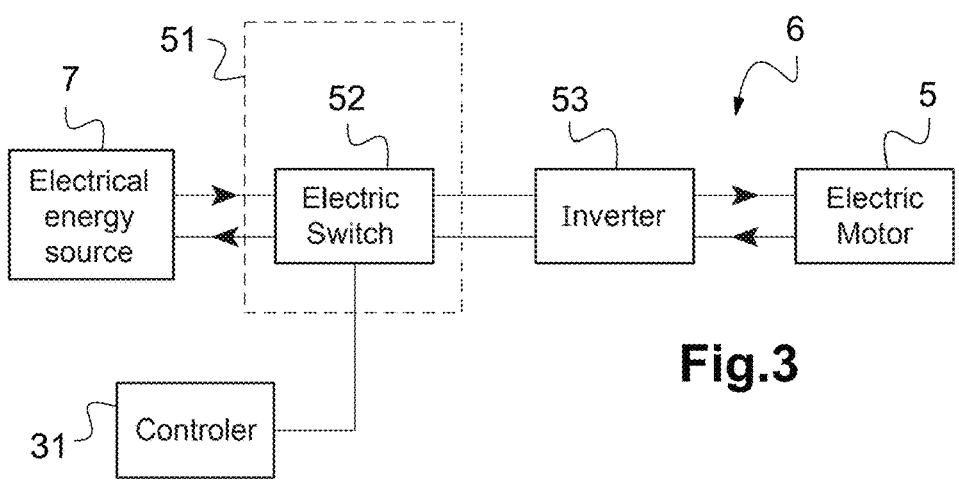
FIG. 3 is a schematic diagram showing a first example of a second variant of the control of a first reversible transmission device, according to the disclosure.
Figure 4:
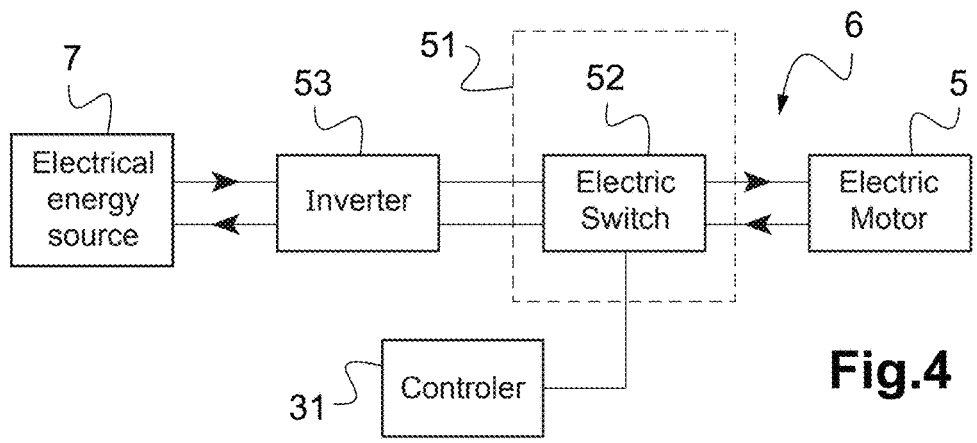
FIG. 4 is a schematic diagram showing a second example of the second variant of the control of a first reversible transmission device, according to the disclosure.

Different variants of the first reversible transmission device 41, 51 are therefore shown in FIGS. 2 to 4.

As shown in FIG. 2, and according to a first variant of the first reversible transmission device 41,51, such a first reversible transmission device 41 may comprise a first clutch 42 positioned in the first mechanical connection 11.

Such a first clutch 42 is therefore connected via wired or wireless means to the controller 31 and receives a control order from the controller 31 to be in an engaged state when the first torque C1 is less than the first limit value VL1. Alternatively, when the first torque C1 is equal to or greater than the first limit value VL1, the first clutch 42 receives another control order from the controller 31 to be in a disengaged state preventing the transmission of the first torque C1 to the first input shaft 10.

According to a second variant of the first reversible transmission device 41,51, the first reversible transmission device 51 may comprise an electric switch 52 positioned in the electrical connection 6.

Such an electric switch 52 is also connected via wired or wireless means to the controller 31 and receives a control order from the controller 31 to be in a closed state when the first torque C1 is less than the first limit value VL1. Alternatively, when the first torque C1 is greater than or equal to the first limit value VL1, the electric switch 52 receives another control order from the controller 31 to be arranged in an open state, thus cancelling the first torque C1.

As shown in FIG. 3, this electrical connection 6 may comprise an inverter 53 transforming a direct electric current of electricity stored in the electrical energy source 7 into an alternating electric current supplying the electric motor with electricity 5. According to a first example of the second variant, the electric switch 52 may then be positioned along a direction of flow of the electric current between the electrical energy source 7 and the inverter 53.

According to a second example of the second variant as shown in FIG. 4, the electric switch 52 may alternatively be positioned along a direction of flow of the electricity between the inverter 53 and at least one terminal 54, 55 supplying electricity to the electric motor 5.

Moreover, the monitoring system 1 may comprise at least one second sensing device 26 measuring a second item of torque information representative of a second engine torque C2 transmitted by the second drive shaft 18 to the second input shaft 12.

Advantageously, a second sensing device 26 may comprise a torquemeter 27 directly measuring the second engine torque C2.

The memory 30 may therefore also be used to store a second limit value VL2 relating to the second engine torque C2.

Similarly, the controller 31 may receive or calculate the second engine torque C2 in order to then compare the second engine torque C2 with the second limit value VL2.

The controller 31 may then generate a control order to control a second reversible transmission device 61, 71 configured to transmit and, alternatively, prevent the transmission of the second engine torque C2.

Such a second reversible transmission device 61, 71 is therefore controlled by the controller 31 to allow the second drive shaft 18 to rotate the second input shaft 12 when the second engine torque C2 is less than the second limit value VL2.

Alternatively, the second reversible transmission device 61, 71 may be controlled by the controller 31 to prevent the second drive shaft 18 from rotating the second input shaft 12 when the second engine torque C2 is greater than or equal to the second limit value VL2.

Figure 5:
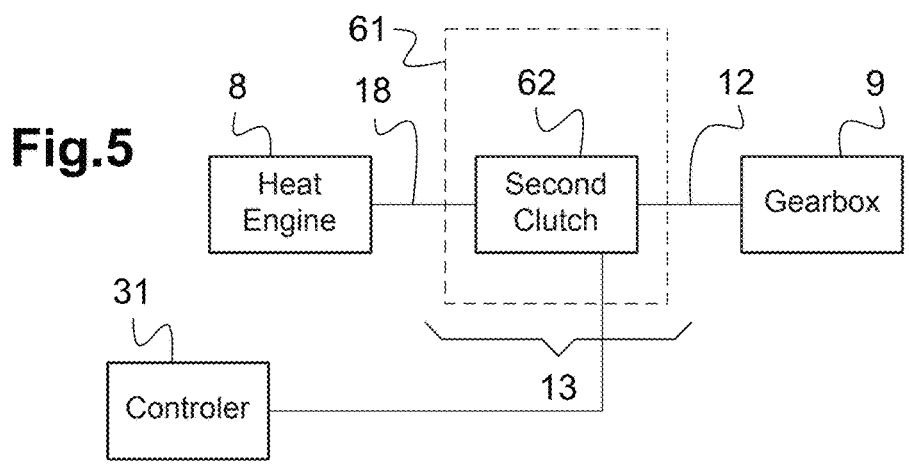
FIG. 5 is a schematic diagram showing a first variant of the control of a second reversible transmission device, according to the disclosure.

As shown in FIG. 5, a first variant of this second reversible transmission device 61 may comprise a second clutch 62 positioned in the second mechanical connection 13.

This second clutch 62 thus receives a control order from the controller 31 to be in an engaged state when the second engine torque C2 is less than the second limit value VL2.

Alternatively, the clutch 62 receives another control order from the controller 31 to be in a disengaged state when the second engine torque C2 is equal to or greater than the second limit value VL2. Therefore, when in its disengaged state, the clutch 62 makes it possible to prevent the transmission of the second engine torque C2 to the second input shaft 12.

Figure 6:
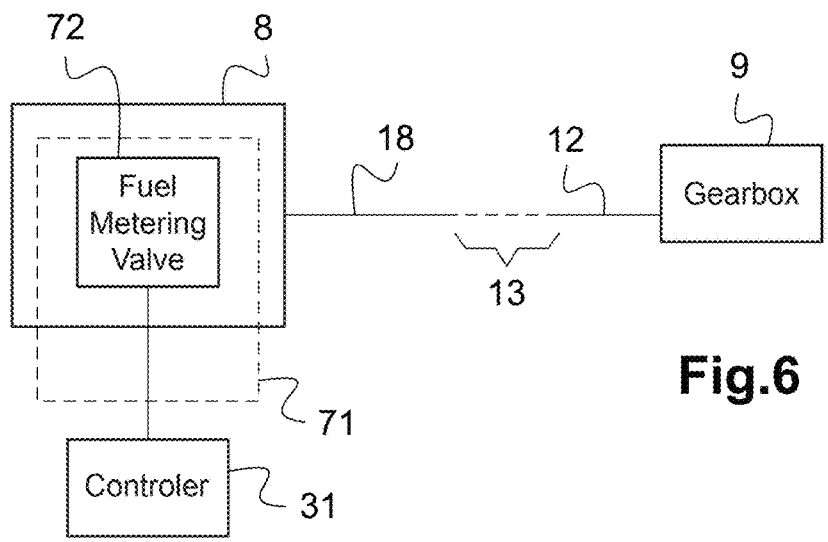
FIG. 6 is a schematic diagram showing a second variant of the control of a second reversible transmission device, according to the disclosure.

As shown in FIG. 6, a second variant of this second reversible transmission device 71 may comprise a fuel metering valve 72 supplying fuel to the heat engine 8. The fuel metering valve 72 receives a control order from the controller 31 to be in an open state with a non-zero fuel flow rate when the second engine torque C2 is less than the second limit value VL2.

Alternatively, when said second engine torque C2 is greater than or equal to said second limit value VL2, the fuel metering valve 72 receives another control order from the controller 31 to be in a closed state with no fuel flow, preventing fuel from being supplied to the heat engine 8 and therefore preventing the second engine torque C2 from being transmitted to the second input shaft 12.

Figure 7:
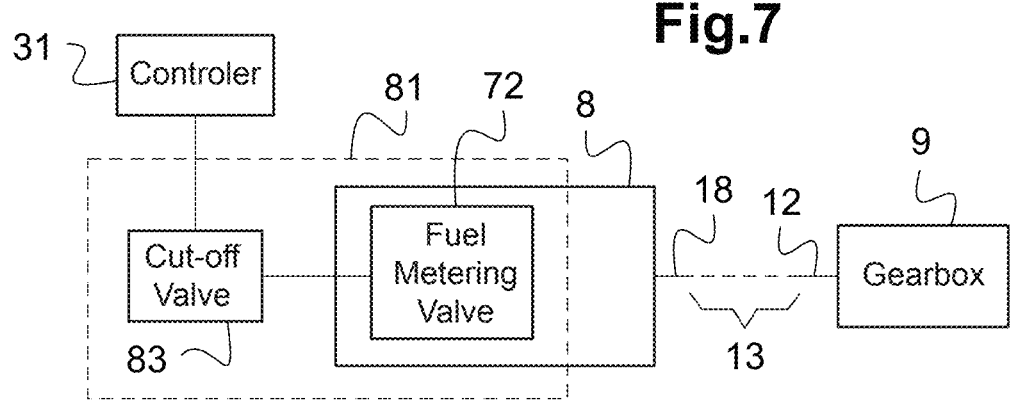
FIG. 7 is a schematic diagram showing a third variant of the control of a second reversible transmission device, according to the disclosure.

As shown in FIG. 7, a third variant of this second reversible transmission device 81 may comprise a shut-off valve 83 arranged upstream of the fuel metering valve 72 supplying fuel to the heat engine 8. The shut-off valve 83 receives a control order from the controller 31 to be in an open position with a non-zero fuel flow rate when the second engine torque C2 is less than the second limit value VL2.

Alternatively, when said second engine torque C2 is greater than or equal to the second limit value VL2, the shut-off valve 83 receives another control order from the controller 31 to be in a closed position so as to cut off the flow of fuel and prevent fuel from being supplied to the heat engine 8. In this case, the second engine torque C2 can no longer be transmitted to the second input shaft 12.

Furthermore, according to FIG. 1, the monitoring system 1 may also comprise at least one third sensing device 28 measuring a third item of torque information representative of a third engine torque C3 transmitted by the output shaft 20 to said at least one rotor 4.

The memory 30 may therefore be used to store a third limit value VL3 relating to the third engine torque C3.

Therefore, the controller 31 can then compare the third engine torque C3 with the third limit value VL3 and generate at least one control order transmitted to at least one of the reversible transmission devices 41, 51, 61, 71 from among the first and second reversible transmission devices.

Furthermore, the reversible transmission device or devices 41, 51, 61, 71 are then controlled to allow the first and second drive shafts 15, 18 to rotate the first and second input shafts 10, 12 when the third engine torque C3 is less than the third limit value VL3 and to prevent at least one of the first and second drive shafts 15, 18 from rotating the first or the second input shaft 10, 12 respectively when the third engine torque C3 is greater than or equal to the third limit value VL3.

The monitoring system 1 may also comprise an alerter capable of generating a first alert and a second alert that are different from each other. Each alert may be in the form of a visual alarm, for example emitting a light with a light-emitting diode or an equivalent or one or more characters being displayed on a screen, an audible alarm, via a loudspeaker, and/or a haptic alarm, for example by means of a vibrating unit causing a member held or worn by an individual to vibrate.

For example, a first alert may be generated when the first engine torque C1 is greater than or equal to a first alert value VA1 and a second alert may be generated when the first engine torque C1 is greater than or equal to a second alert value VA2 greater than the first alert value VA1.

The first alert value VA1 is therefore chosen to be less than the first limit value VL1. The second alert value VA2 may be chosen to be less than or equal to the first limit value VL1.

The first alert may be a message or a warning displayed on a display for the pilot of the rotorcraft.

The second alert may be a light and/or sound signal issued to the pilot of the rotorcraft.

Figure 8:
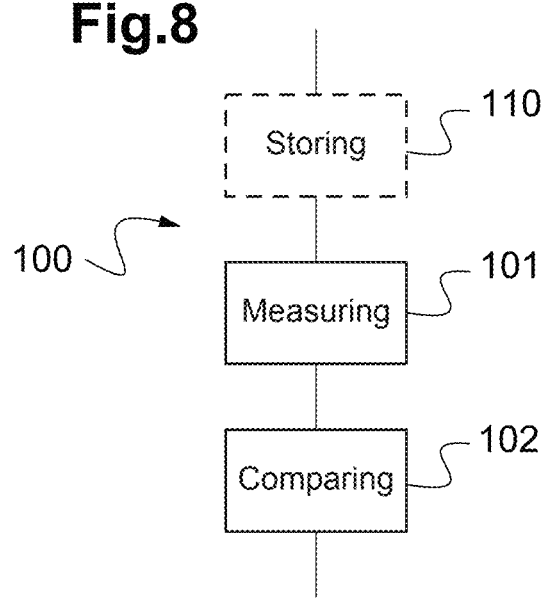
FIG. 8 is a logic diagram representative of a monitoring method according to the disclosure.

As shown in FIG. 8, the disclosure also relates to a monitoring method 100 for monitoring a hybrid power plant 2 as disclosed above of a rotorcraft 3 comprising at least one rotor 4.

Such a monitoring method 100 comprises measuring 101, with said at least one first sensing device 16, 17, 19, the first item of torque information representative of the first engine torque C1, then comparing 102, with the controller 31, the first engine torque C1 and the first limit value VL1.

The monitoring method 100 then comprises controlling 103, with the controller 31, a first reversible transmission device 41, 51 configured to transmit and, alternatively, prevent the transmission of the first engine torque C1.

Advantageously, the monitoring method 100 may comprise a preliminary step of storing 110 the first limit value VL1 in the memory 30.

Naturally, the present disclosure is subject to numerous variations as regards its implementation. Although several embodiments are described above, it should readily be understood that it is not conceivable to identify exhaustively all the possible embodiments. It is naturally possible to envisage replacing any of the means described by equivalent means without going beyond the ambit of the present disclosure.

What is claimed is:

1. A monitoring system for monitoring a hybrid power plant of a rotorcraft comprising at least one rotor, the hybrid power plant comprising:
    an electric motor electrically connected by an electrical connection to at least one electrical energy source, the electric motor comprising a first drive shaft;
    a heat engine comprising a second drive shaft; and
    a gearbox comprising:
    a first input shaft connected by a first mechanical connection to the first drive shaft;
    a second input shaft connected by a second mechanical connection to the second drive shaft; and
    an output shaft connected by a third mechanical connection to the at least one rotor,
    the monitoring system comprising:
    at least one first sensing device measuring a first item of torque information representative of a first engine torque C1 transmitted by the first drive shaft to the first input shaft; and
    a memory storing a first limit value VL1 relating to the first engine torque C1,
    wherein the monitoring system comprises a controller and a first reversible transmission device, the controller comparing the first engine torque C1 with the first limit value VL1 and consequently controlling the first reversible transmission device transmitting the first engine torque C1 and, alternatively preventing the transmission of the first engine torque C1, the first reversible transmission device being controlled to allow the first drive shaft to rotate the first input shaft when the first engine torque C1 is less than the first limit value VL1 and to prevent the first drive shaft from rotating the first input shaft when the first engine torque C1 is greater than or equal to the first limit value VL1.

2. The system according to claim 1,
    wherein the first reversible transmission device comprises a first clutch positioned in the first mechanical connection, the first clutch being arranged in an engaged state when the first torque C1 is less than the first limit value VL1 and the first clutch being arranged in a disengaged state when the first torque C1 is greater than or equal to the first limit value VL1.

3. The system according to claim 1,
    wherein the first reversible transmission device comprises an electric switch positioned in the electrical connection, the electric switch being arranged in a closed state when the first torque C1 is less than the first limit value VL1 and the electric switch being arranged in an open state when the first torque C1 is greater than or equal to the first limit value VL1.

4. The system according to claim 3,
    wherein the electrical connection comprises an inverter transforming a direct electric current of electricity stored in the at least one electrical energy source into an alternating electric current supplying electricity to the electric motor, the electric switch being positioned along a direction of flow of the electric current between the at least one electrical energy source and the inverter.

5. The system according to claim 3,
    wherein the electrical connection comprises an inverter transforming a direct electric current of electricity stored in the at least one electrical energy source into an alternating electric current supplying electricity to the electric motor, the electric switch being positioned along a direction of flow of the electric current between the inverter and at least one terminal supplying electricity to the electric motor.

6. The system according to claim 1,
    wherein the at least one first sensing device comprises a voltage sensor measuring an electrical supply voltage between two terminals supplying electricity to the electric motor and an intensity sensor measuring an electrical intensity of an electric supply current flowing in the electrical connection.

7. The system according to claim 1,
    wherein the at least one first sensing device comprises a rotational speed sensor measuring a rotational speed of the first drive shaft in relation to a housing of the electric motor.

8. The system according to claim 1,
    wherein the monitoring system comprises:
    at least one second sensing device measuring a second item of torque information representative of a second engine torque C2 transmitted by the second drive shaft to the second input shaft;
    the memory storing a second limit value VL2 relating to the second engine torque C2; and
    the controller comparing the second engine torque C2 with the second limit value VL2 and controlling a second reversible transmission device configured to transmit and, alternatively, prevent the transmission of the second engine torque C2, the second reversible transmission device being controlled to allow the second drive shaft to rotate the second input shaft when the second engine torque C2 is less than the second limit value VL2 and to prevent the second drive shaft from rotating the second input shaft when the second engine torque C2 is greater than or equal to the second limit value VL2.

9. The system according to claim 8,
    wherein the second reversible transmission device comprises a second clutch positioned in the second mechanical connection, the second clutch being arranged in an engaged state when the second engine torque C2 is less than the second limit value VL2 and the clutch being arranged in a disengaged state when the second torque C2 is greater than or equal to the second limit value VL2.

10. The system according to claim 8,
    wherein the second reversible transmission device comprises a fuel metering valve supplying fuel to the heat engine, the fuel metering valve being arranged in an open state with a non-zero fuel flow rate when the second engine torque C2 is less than the second limit value VL2 and the fuel metering valve being arranged in a closed state with no fuel flow when the second engine torque C2 is equal to or greater than the second limit value VL2.

11. The system according to claim 8,
wherein the second reversible transmission device comprises a cut-off valve supplying fuel to a fuel metering valve, the cut-off valve being arranged in an open position with a non-zero fuel flow rate when the second engine torque C2 is less than the second limit value VL2 and the cut-off valve being arranged in a closed position to cut off the flow of fuel when the second engine torque C2 is equal to or greater than the second limit value VL2.

12. The system according to claim 8,
wherein the at least one second sensing device comprises a torquemeter directly measuring the second engine torque C2.

13. The system according to claim 8,
wherein the monitoring system comprises:
at least one third sensing device measuring a third item of torque information representative of a third engine torque C3 transmitted by the output shaft to the at least one rotor;
the memory storing a third limit value VL3 relating to the third engine torque C3; and
the controller comparing the third engine torque C3 with the third limit value VL3 and controlling at least one reversible transmission device from among the first and second reversible transmission devices, the at least one reversible transmission device being controlled to allow the first and second drive shafts to rotate the first and second input shafts when the third engine torque C3 is less than the third limit value VL3 and to prevent at least one of the first and second drive shafts from rotating the first or the second input shaft respectively when the third engine torque C3 is greater than or equal to the third limit value VL3.

14. The system according to claim 13,
wherein, when the third engine torque C3 is greater than or equal to the third limit value VL3, the controller firstly controls the first reversible transmission device to prevent the first drive shaft from rotating the first input shaft, then the controller controls the second reversible transmission device to prevent the second drive shaft from rotating the second input shaft.

15. The system according to claim 13,
wherein, when the third engine torque C3 is greater than or equal to the third limit value VL3, the controller simultaneously controls the first reversible transmission device to prevent the first drive shaft from rotating the first input shaft and the second reversible transmission device to prevent the second drive shaft from rotating the second input shaft.

16. A rotorcraft comprising a hybrid power plant and at least one rotor, the hybrid power plant comprising:
an electric motor electrically connected by an electrical connection to at least one electrical energy source, the electric motor comprising a first drive shaft;
a heat engine comprising a second drive shaft; and
a gearbox comprising:
a first input shaft connected by a first mechanical connection to the first drive shaft;
a second input shaft connected by a second mechanical connection to the second drive shaft; and
an output shaft connected by a third mechanical connection to the at least one rotor,
wherein the rotorcraft comprises the monitoring system for monitoring the hybrid power plant according to claim 1.

17. A monitoring method for monitoring a hybrid power plant of a rotorcraft comprising at least one rotor, the hybrid power plant comprising:
an electric motor electrically connected by an electrical connection to at least one electrical energy source, the electric motor comprising a first drive shaft;
a heat engine comprising a second drive shaft; and
a gearbox comprising:
a first input shaft connected by a first mechanical connection to the first drive shaft;
a second input shaft connected by a second mechanical connection to the second drive shaft; and
an output shaft connected by a third mechanical connection to the at least one rotor,
the monitoring method comprising at least the following steps:
measuring, with at least one first sensing device, a first item of torque information representative of a first engine torque C1 transmitted by the first drive shaft to the first input shaft; and
comparing, with a controller, the first engine torque C1 and a first limit value VL1,
wherein the monitoring method comprises controlling, with the controller, a first reversible transmission device configured to transmit and, alternatively, prevent the transmission of the first engine torque C1, the first reversible transmission device being controlled to allow the first drive shaft to rotate the first input shaft when the first engine torque C1 is less than the first limit value VL1 and to prevent the first drive shaft from rotating the first input shaft when the first engine torque VL1 is greater than or equal to the first limit value VL1.

18. A monitoring system for monitoring a hybrid power plant of a rotorcraft comprising a rotor, the hybrid power plant comprising:
an electric motor electrically connected by an electrical connection to an electrical energy source, the electric motor comprising a first drive shaft;
a heat engine comprising a second drive shaft; and
a gearbox comprising:
a first input shaft connected by a first mechanical connection to the first drive shaft;
a second input shaft connected by a second mechanical connection to the second drive shaft; and
an output shaft connected by a third mechanical connection to the rotor,
the monitoring system comprising:
a first sensing device capable of measuring a first item of torque information representative of a first engine torque transmitted by the first drive shaft to the first input shaft; and
a memory storing a first limit value relating to the first engine torque,
wherein the monitoring system comprises a controller and a first reversible transmission device, the controller capable of comparing the first engine torque with the first limit value and consequently controlling the first reversible transmission device transmitting the first engine torque and, alternatively, preventing the transmission of the first engine torque, the first reversible transmission device controllable to allow the first drive shaft to rotate the first input shaft when the first engine torque is less than the first limit value and to prevent the first drive shaft from rotating the first input shaft when the first engine torque is greater than or equal to the first limit value.

19. The system according to claim 18,
wherein the first reversible transmission device comprises a first clutch positioned in the first mechanical connection, the first clutch being arranged in a physically engaged state when the first torque is less than the first limit value and the first clutch being arranged in a physically disengaged state when the first torque is greater than or equal to the first limit value.

20. The system according to claim 18,
wherein the first reversible transmission device comprises an electric switch positioned in the electrical connection, the electric switch being arranged in a closed state when the first torque is less than the first limit value and the electric switch being arranged in an open state when the first torque is greater than or equal to the first limit value.

* * * * *